UNITED STATES PATENT OFFICE.

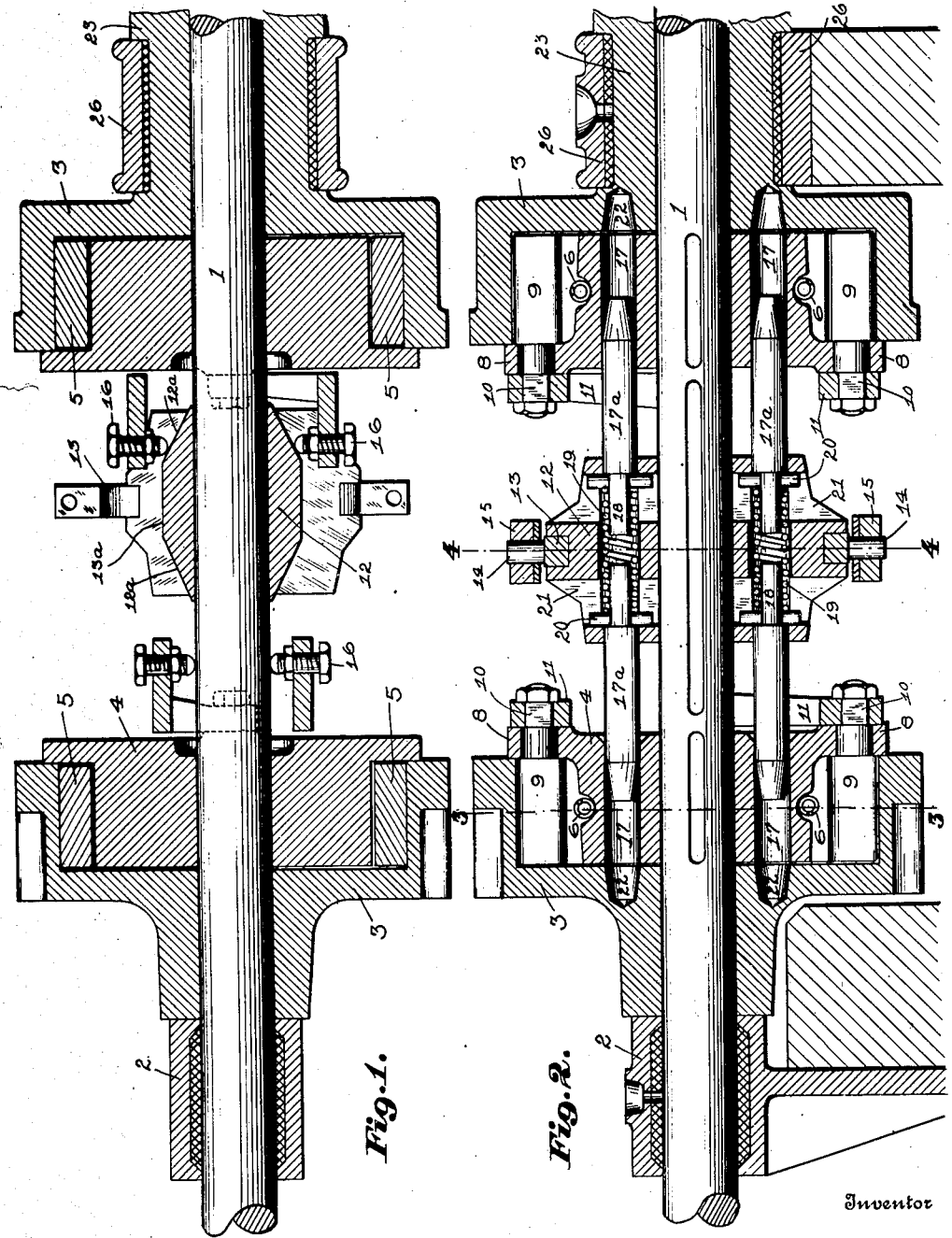

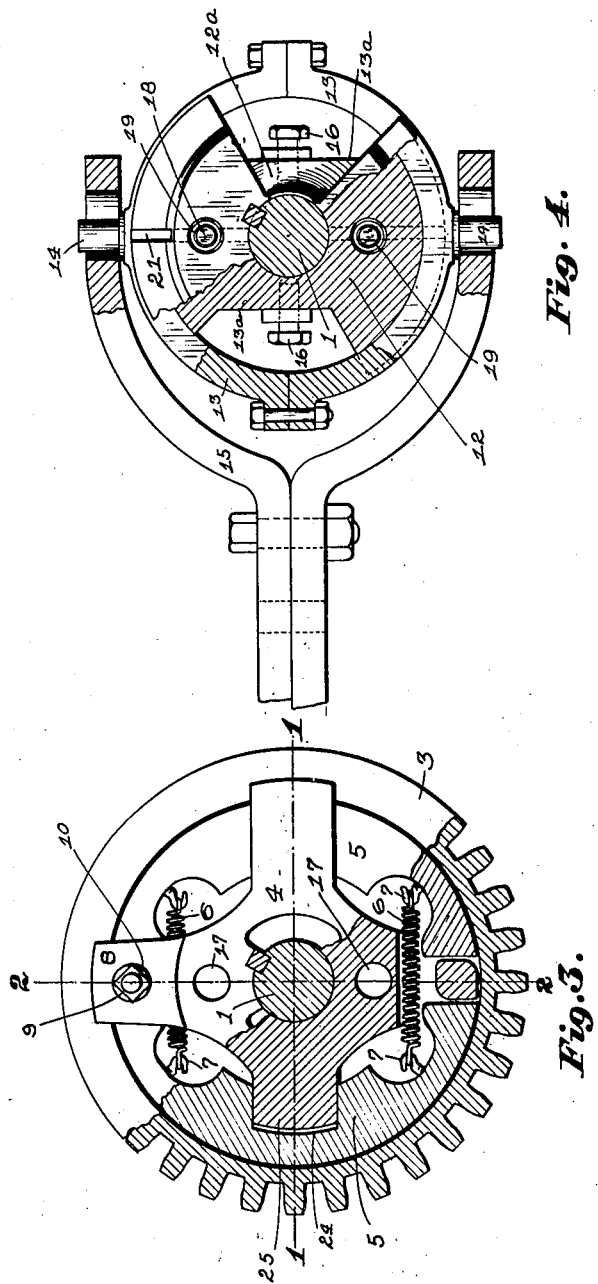

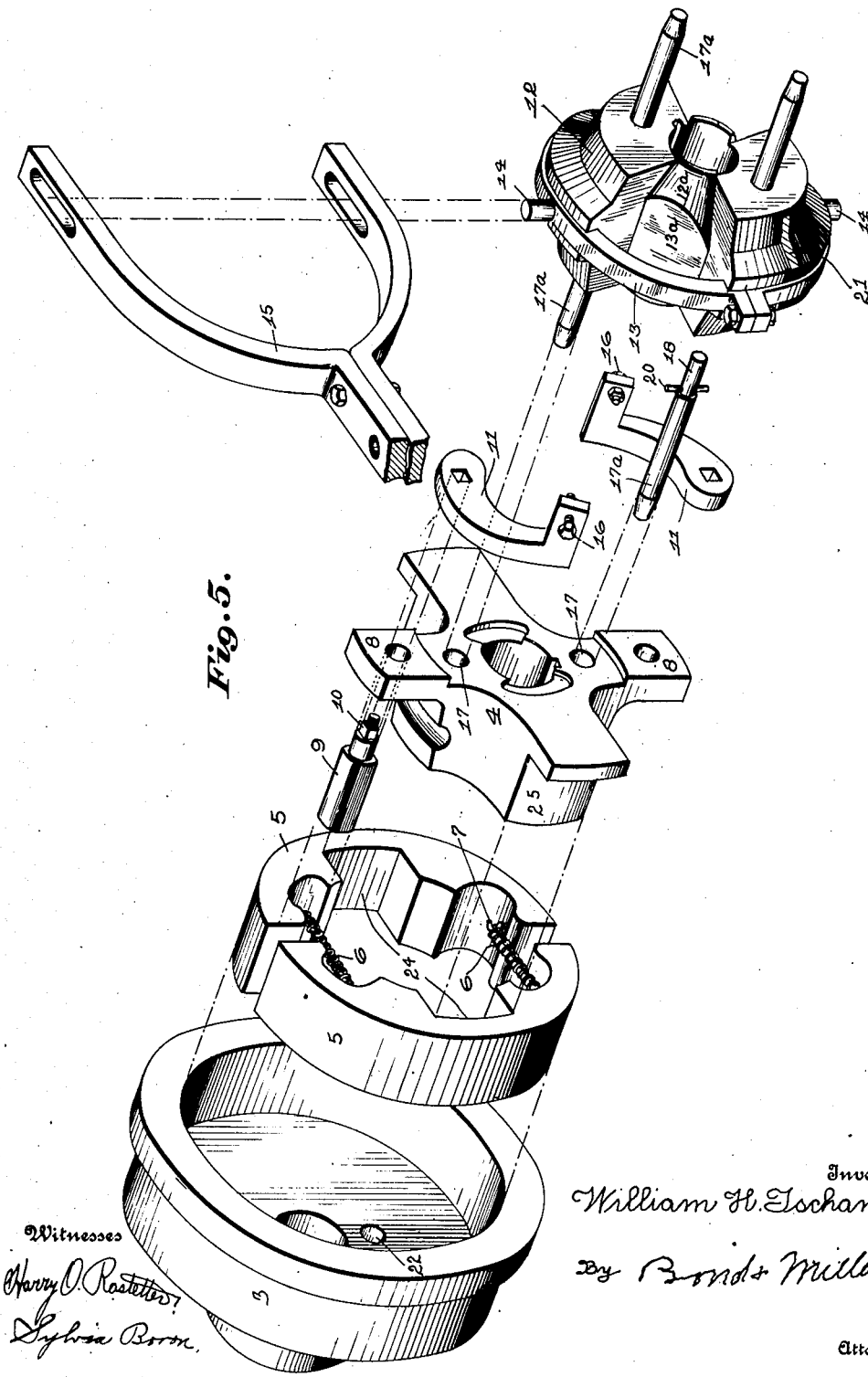

WILLIAM H. TSCHANTZ, OF ORRVILLE, OHIO, ASSIGNOR TO THE CYCLONE DRILL COMPANY, OF ORRVILLE, OHIO, A CORPORATION OF OHIO.

CLUTCH AND MECHANISM THEREFOR.

No. 918,610.  Specification of Letters Patent.  Patented April 20, 1909.

Application filed July 24, 1908. Serial No. 445,086.

*To all whom it may concern:*

Be it known that I, WILLIAM H. TSCHANTZ, a citizen of the United States, residing at Orrville, in the county of Wayne and State of Ohio, have invented certain new and useful Improvements in Clutches and Mechanism Therefor, of which the following is a specification, reference being had to the accompanying drawings.

This invention relates to improvements in clutches designed for positive engagement and frictional engagement.

In the accompanying drawings forming a part of this specification, and in which like numerals indicate corresponding parts in all the figures of the drawings, Figure 1 is a horizontal section taken on line 1—1, Fig. 3. Fig. 2 is a vertical section taken on line 2—2, Fig. 3. Fig. 3 is a face view of the drum or gear wheel, the spider and the expanding segments relatively arranged, and partly shown in section as indicated by line 3—3, Fig. 2. Fig. 4 is a transverse view of the shaft showing the slidable cone mounted thereon, its ring and yoke in proper relationship with reference to said parts, parts shown in section as indicated by line 4—4, Fig. 2. Figs. 5 are detached perspective views of the different parts of the clutch proper showing the shaft removed.

Similar numerals of reference indicate corresponding parts in all the figures of the drawings.

In the accompanying drawings, 1 represents the shaft which is properly journaled in any suitable bearings, such as 2 and the opposite end of the shaft may be carried and supported as hereinafter described or properly journaled in the usual manner. Upon the shaft are mounted the drums or gear wheels 3, which are practically duplicates, but so far as the present invention is concerned and its objects one drum or gear wheel is all that is necessary unless it is desired to provide a double clutch, which is sometimes desirable, reference being had to specific and special uses. In the further description of the present invention it will be described with reference to a single drum or gear wheel and the different parts pertaining thereto numbered in duplicate, or in other words a single clutch and its different parts will be described while two are shown in the drawings.

Upon the shaft 1 is fixedly mounted the spider 4, around which spider are located the frictional segments 5, which segments are yieldingly tied together by means of the springs 6 and the hooks 7 or their equivalents, said frictional segments when properly arranged are located in the chamber of the drum or gear wheel 3 as illustrated in Figs. 1, 2 and 3. In the arms 8 of the spider 4 are journaled the cam-bars 9, which cam-bars are provided with the angled portions 10, to which angled portions are attached the levers 11, which levers are for the purpose of oscillating the cam-bars 9 as hereinafter described, and for the purpose pointed out. Upon the shaft 1 is slidably and rotatably mounted the beveled faced head 12, upon which beveled faced head is connected the usual segments 13, which segments are connected together to produce an ordinary and common connecting ring, said ring being provided with the ordinary pins 14, which pins are for the purpose of providing a means for operatively connecting the lever-yoke 15. These parts so far as the ring pins and yoke are concerned are common and need no specific detailed description.

It will be understood that when the beveled faced head 12 is moved upon the shaft 1 toward the spider 4, the free ends of the levers 11 will be moved outward or away from the shaft 1 by reason of the inner ends of the adjusting screws 16 coming in contact with the beveled faces 12ª on the head 12. When the movement just above described is imparted to the levers 11, a rocking or oscillating movement will be imparted to the cam-bars 9, which movement spreads or parts the segments 5, thereby producing frictional contact as between the outer surfaces of said segments and the inner periphery of the drum or gear wheel 3, thereby frictionally coupling the fixed spider 4 with the loosely mounted drum or gear wheel 3 and causing the drum or gear wheel 3 to rotate with the shaft 1.

The parts just above described produce only frictional contact as between the parts brought into contact, that is to say the segments 5 and the drum 3. It will be understood that in bringing idle portions of machines into action it is of importance that this action be gradual, so that there will be no jerking or quick action; but after the parts are brought into action by the movements of the clutch members, it is desirable that a positive connection be made other than frictional, so that the transmission of power is not dependent solely upon friction.

For the purpose of producing a positive connection as between the parts fixed to the shaft 1 and the loosely mounted drum or clutch member 3 the beveled faced head 12 is provided with the coupling pins 17ª, which coupling pins are formed of a sufficient length to be extended through the apertures 17 formed in the spider 4 and entered in the apertures 22 formed in the drum or gear wheel 3 and when the pins are entered in the apertures 22 the drum or gear wheel 3 will rotate in unison with the parts fixed to the shaft 1. I prefer to form the pins 17ª of such a length that they will not as a rule be detached or disconnected from the spider 4.

For the purpose of providing a yielding reciprocating movement for the pins 17ª, said pins are provided with the reduced inner ends 18, around which inner ends are located the springs 19, which springs abut against the cross pins 20 or their equivalents, said cross pins being secured to the reduced portions 18; but this specific detailed construction is immaterial, as the only object is to provide a yielding movement for the pins 17ª. In the drawings I have illustrated slots 21 formed in the head 12 so as to allow the cross pins 20 to move back and forth with the reciprocating movement of the pins 17ª.

It will be understood that after the frictional segments 5 have been brought into proper engagement with the drum 3 there can be no further outward movement of the frictional segments 5 and in order that the slidable head 12 can be further moved so as to carry the pins to bring them into proper engagement with the apertures 22 the head 12 is provided with the non-beveled or straight faced surface 13ª upon which straight faced surface, the set screws 16 ride without imparting any outward movement to the levers 11. The set screw 16 should be so adjusted with reference to the levers 11 that when they have fully passed the inclined surfaces 12ª the proper frictional contact will have been made and the head 12 and the drum frictionally connected together. By providing the straight faced surfaces 13ª, a sufficient movement of the head 12 carrying the pins 17ª can be first made without moving the frictional segments 5 away from the inner periphery of the drum 3, said movement being for the purpose of detaching the pins 17ª from the apertures 22 at which time frictional connection is still maintained but by a further movement of the head 12 the frictional connection is released.

It will be understood that by providing the springs 19 and locating them as shown, the pins 17ª will be automatically thrust into the apertures 22 in case or in the event of any slipping of the frictional segments or clutch shoes 5. By providing the pins 17ª, and the springs 19 and forming the apertures 22, a positive clutch is produced by means of the engagement of the pins with the apertures which engagement is automatically accomplished by means of the springs 19.

It will be understood that as the head 12 approaches the spider 4, the pins 17ª will be carried with such movement and in case the apertures 22 do not at first register with the pins 17ª said pins will be held against movement, but the beveled faced head is free to move until the segments 5 are sufficiently spread to produce frictional contact with reference to the drum or gear wheel 3, but the instant the apertures 22 and the ends of the pins 17ª register the springs 19 will force the pins 17ª endwise thereby positively coupling or connecting the drum or gear wheel 3 with the spider 4, thus producing a positive connection as well as a frictional connection. For the purpose of insuring positive rotation as between the frictional segments 5 and the spider 4, said segments are provided with the recesses 24 into which recesses the flanges 25 are seated as best illustrated in Fig. 3.

In Figs. 1 and 2 one end of the shaft 1 is shown located in the hub 23 and the hub 23 journaled in the bearing 26. This arrangement is for the purpose of attaching any desired part to the hub such as a crank or power wheel if desired.

Having fully described my invention what I claim as new and desire to secure by Letters Patent, is—

1. In a clutch of the class described, a shaft having loosely mounted thereon a chambered drum or gear wheel having apertures, a spider fixedly mounted upon said shaft, segments located around the spider, said segments located in the chamber of the drum or gear wheel and yieldingly connected together, cam bars carried by the spider and located between the spaced ends of the segments, levers connected to the cam bars, said levers provided with screws at their free ends, a beveled head slidably mounted upon the shaft, said beveled head adapted to actuate the levers connected to the cam bars, and pins slidably mounted in the beveled head and adapted for engagement with the apertures in the chambered drum or gear wheel, substantially as and for the purpose specified.

2. In a clutch of the class described, a shaft having loosely mounted thereon a chambered drum or gear wheel having apertures, a spider fixedly mounted upon said shaft, segments located around the spider, said segments located in the chamber of the drum or gear wheel and yieldingly connected together, cam bars carried by the spider and located between the spaced ends of the segments, levers connected to the cam bars, said levers provided with screws at their free ends, a beveled head slidably mounted upon the shaft, said beveled head adapted to actuate the levers connected to the cam bars, pins slidably mounted in the beveled head and adapted for engagement with the apertures in the chambered drum or gear wheel, and springs adapted to actuate the pins.

3. In a clutch of the class described, a shaft having loosely mounted thereon a chambered drum or gear wheel, a spider fixedly mounted upon said shaft, said spider provided with apertures, segments located around the spider and in the chamber of the drum or gear wheel, springs adapted to yieldingly connect the segments together, cam bars carried by the spider and located between the adjacent ends of the segments, levers connected to the cam bars, a beveled head slidably mounted upon the shaft, said beveled head adapted to actuate the levers connected to the cam bars, and pins carried by the beveled head and slidably mounted therein, substantially as and for the purpose specified.

4. In a clutch of the class described, a shaft having loosely mounted thereon a clutch member, a spider fixedly mounted on said shaft, friction segments connected to the spider to rotate therewith, cam bars located between the friction segments carried by the spider, said friction segments adapted for contact with the loosely mounted clutch member, levers connected to the cam bars, a beveled faced head slidably mounted upon the shaft, pins slidably mounted in said beveled faced head, said pins located through the spider and adapted for engagement with the loosely mounted clutch member, and springs adapted to move the pins when released, substantially as and for the purpose specified.

5. In a clutch of the class described, a shaft having loosely mounted thereon a clutch member, a spider fixedly mounted on said shaft, friction segments connected to the spider to rotate therewith, cam bars located between the friction segments carried by the spider, said friction segments adapted for contact with the loosely mounted clutch member, levers connected to the cam bars, a beveled faced head slidably mounted upon the shaft, pins slidably mounted in said beveled faced head and provided with cross pins, said pins located through the spider and adapted for engagement with the loosely mounted clutch member, and springs adapted to move the pins when released, substantially as and for the purpose specified.

In testimony that I claim the above, I have hereunto subscribed my name in the presence of two witnesses.

WILLIAM H. TSCHANTZ.

Witnesses:
F. W. BOND,
SYLVIA BORON.